(12) United States Patent
Berguig

(10) Patent No.: US 11,897,678 B2
(45) Date of Patent: Feb. 13, 2024

(54) PAPER RECYCLABLE HEAT SEALABLE BAG

(71) Applicant: PACKAGING AIDS CORPORATION, San Rafael, CA (US)

(72) Inventor: Gregory Berguig, Tiburon, CA (US)

(73) Assignee: PACKAGING AIDS CORPORATION, San Rafael, CA (US)

( * ) Notice: Subject to any disclaimer, the term of this patent is extended or adjusted under 35 U.S.C. 154(b) by 38 days.

(21) Appl. No.: 17/499,998

(22) Filed: Oct. 13, 2021

(65) Prior Publication Data
US 2022/0112015 A1   Apr. 14, 2022

Related U.S. Application Data

(60) Provisional application No. 63/090,803, filed on Oct. 13, 2020.

(51) Int. Cl.
*B65D 65/42* (2006.01)
*B65D 33/18* (2006.01)
(Continued)

(52) U.S. Cl.
CPC .............. *B65D 65/42* (2013.01); *B65B 5/045* (2013.01); *B65B 7/02* (2013.01); *B65B 43/04* (2013.01);
(Continued)

(58) Field of Classification Search
CPC ...... B65D 65/42; B65D 33/002; B65D 33/18; B65B 5/045; B65B 7/02; B65B 43/04; B65B 51/10
(Continued)

(56) References Cited

U.S. PATENT DOCUMENTS 2,099,314 A * 11/1937 Potdevin ................. B31B 70/00
83/339
3,474,053 A * 10/1969 Weber ..................... D21H 19/70
523/447
(Continued)

FOREIGN PATENT DOCUMENTS

BR    202012030859 U2    11/2014
DE       4139467 A1     6/1993
(Continued)

OTHER PUBLICATIONS

Written Opinion of the International Searching Authority dated Jan. 26, 2022.

*Primary Examiner* — Dariush Seif
(74) *Attorney, Agent, or Firm* — Jacob M. Ward; Ward Law Office LLC

(57) ABSTRACT

The paper recyclable heat sealable bag includes a heat sealable water soluble inner layer coating and an article of paper. The heat sealable coating is applied to the article of paper by a printing press. As the printing press applies the heat sealable coating to the article of paper, the paper recyclable heat sealable bag may be wound into a master roll with a plurality of paper recyclable heat sealable bags. The master roll is fed into an automatic packaging system which fills the bags with a product from at least one of a top edge and a side edge of the paper recyclable heat sealable bags. The paper recyclable heat sealable bag has certain perforations to remove the paper recyclable heat sealable bag more easily from the master roll and sealed with a heat sealer.

20 Claims, 8 Drawing Sheets

(51) Int. Cl.
| | |
|---|---|
| *B65D 33/00* | (2006.01) |
| *B65B 43/04* | (2006.01) |
| *B65B 5/04* | (2006.01) |
| *B65B 7/02* | (2006.01) |
| *B65B 51/10* | (2006.01) |

(52) U.S. Cl.
CPC ............ *B65B 51/10* (2013.01); *B65D 33/002* (2013.01); *B65D 33/18* (2013.01)

(58) Field of Classification Search
USPC .......................................................... 53/415
See application file for complete search history.

(56) References Cited

U.S. PATENT DOCUMENTS

| | | | | |
|---|---|---|---|---|
| 5,041,227 | A * | 8/1991 | van Eikeren | C12P 41/007 210/651 |
| 5,215,275 | A * | 6/1993 | Gold | B31B 70/005 493/194 |
| 5,332,586 | A * | 7/1994 | Di Mino | B32B 27/10 428/34.3 |
| 5,474,818 | A * | 12/1995 | Ulrich | B29C 66/81435 428/34.3 |
| 5,505,969 | A * | 4/1996 | Wood | C08J 5/18 426/106 |
| 5,661,099 | A * | 8/1997 | Mitchell, Jr. | B41M 5/42 283/105 |
| 5,670,015 | A * | 9/1997 | Finestone | B32B 38/04 40/6 |
| 5,690,853 | A * | 11/1997 | Jackson | B65D 81/3469 219/730 |
| 5,691,015 | A * | 11/1997 | Tsukamoto | B65D 65/46 383/111 |
| 5,985,772 | A * | 11/1999 | Wood | B65D 1/0207 442/67 |
| 6,015,582 | A * | 1/2000 | Kageyama | B65D 81/264 426/106 |
| 6,083,586 | A * | 7/2000 | Andersen | B29C 53/063 106/206.1 |
| 6,935,783 | B2 | 8/2005 | Carter | B65D 75/5811 383/207 |
| 8,568,029 | B2 * | 10/2013 | Kannankeril | B65B 55/20 383/3 |
| 9,027,567 | B2 * | 5/2015 | Gee | A24B 13/00 131/357 |
| 11,161,948 | B2 * | 11/2021 | Backfolk | B65D 65/40 |
| 2002/0006485 | A1 * | 1/2002 | Bening | B65D 65/46 206/524.1 |
| 2002/0068136 | A1 * | 6/2002 | Finestone | B32B 7/05 428/34.3 |
| 2002/0164440 | A1 * | 11/2002 | Leeper | D21H 19/16 428/512 |
| 2003/0031763 | A1 * | 2/2003 | Inagaki | B65D 81/3461 426/107 |
| 2003/0194472 | A1 * | 10/2003 | Jensen | A23L 7/183 426/107 |
| 2005/0184065 | A1 * | 8/2005 | Tucker, Jr. | B65D 81/3461 219/730 |
| 2005/0210838 | A1 * | 9/2005 | Mahon | B29C 44/184 53/472 |
| 2008/0296193 | A1 * | 12/2008 | Haskin | B65D 75/002 383/42 |
| 2010/0192520 | A1 * | 8/2010 | Jansen | B65D 33/22 53/477 |
| 2011/0211778 | A1 * | 9/2011 | Zerfas | B32B 27/306 493/213 |
| 2012/0117921 | A1 * | 5/2012 | Toft | B29C 66/72341 427/404 |
| 2012/0196731 | A1 * | 8/2012 | Sargin | B65D 33/22 493/227 |
| 2013/0031875 | A1 * | 2/2013 | Sargin | B65D 33/22 156/497 |
| 2013/0034317 | A1 * | 2/2013 | Sargin | B31B 70/64 493/260 |
| 2014/0315776 | A1 * | 10/2014 | Krubasik | C11D 17/0013 510/439 |
| 2015/0266626 | A1 * | 9/2015 | Forman | B65D 75/5855 383/42 |
| 2016/0145023 | A1 * | 5/2016 | Mathew | B65D 75/5827 206/484 |
| 2016/0185498 | A1 * | 6/2016 | Henderson | B32B 27/306 156/60 |
| 2016/0192703 | A1 * | 7/2016 | Sebastian | A24B 13/00 131/352 |
| 2016/0200502 | A1 * | 7/2016 | Grossman | A23L 21/25 426/115 |
| 2017/0094995 | A1 * | 4/2017 | Eskamani | A23L 3/10 |
| 2017/0129216 | A1 * | 5/2017 | Shimizu | F16L 59/028 |
| 2017/0253925 | A1 * | 9/2017 | Sargin | B65D 31/04 |
| 2017/0259976 | A1 * | 9/2017 | Lee | A45F 5/00 |
| 2018/0009202 | A1 * | 1/2018 | Sasaki | B32B 27/36 |
| 2018/0099786 | A1 * | 4/2018 | Abuaita | B65D 33/34 |
| 2018/0148246 | A1 * | 5/2018 | Fu | B32B 29/02 |
| 2018/0201886 | A1 * | 7/2018 | Schulz | C11D 3/3715 |
| 2018/0311940 | A1 * | 11/2018 | Toft | B32B 15/082 |
| 2019/0062028 | A1 * | 2/2019 | Getty | B32B 27/10 |
| 2019/0125126 | A1 * | 5/2019 | Cohen | A47J 44/00 |
| 2019/0218403 | A1 * | 7/2019 | Sasaki | B65D 65/42 |
| 2019/0291337 | A1 * | 9/2019 | Mandzsu | B29C 48/0018 |
| 2019/0299248 | A1 * | 10/2019 | Mandzsu | B32B 27/12 |
| 2020/0122909 | A1 * | 4/2020 | Jobe | B65D 5/0281 |
| 2020/0131708 | A1 * | 4/2020 | Triclot | C09D 191/06 |
| 2020/0163813 | A1 * | 5/2020 | Sheehan | A61F 13/15747 |
| 2020/0269554 | A1 * | 8/2020 | Noda | D21H 19/82 |
| 2020/0353724 | A1 * | 11/2020 | Vestergaard Frandsen | B31B 70/16 |
| 2020/0407136 | A1 * | 12/2020 | Kishimoto | C08J 7/06 |
| 2021/0086948 | A1 * | 3/2021 | Pagliani | B65D 27/16 |
| 2021/0086976 | A1 * | 3/2021 | France | B65D 81/3469 |
| 2021/0169138 | A1 * | 6/2021 | Hutchens | D04H 1/4266 |
| 2021/0300651 | A1 * | 9/2021 | Forloni | B65D 75/002 |
| 2022/0110802 | A1 * | 4/2022 | Remus | A61F 13/5514 |
| 2022/0227555 | A1 * | 7/2022 | Yamamoto | C08J 7/048 |
| 2022/0298398 | A1 * | 9/2022 | Sato | B32B 27/08 |
| 2022/0314580 | A1 * | 10/2022 | Nagotkar | B32B 7/12 |

FOREIGN PATENT DOCUMENTS

| | | |
|---|---|---|
| DE | 4139468 A1 | 6/1993 |
| JP | H08169416 A1 | 7/1996 |
| JP | 2004001885 A | 1/2004 |
| JP | 4825380 B2 | 11/2011 |
| WO | 2018/200783 A1 | 11/2018 |

* cited by examiner

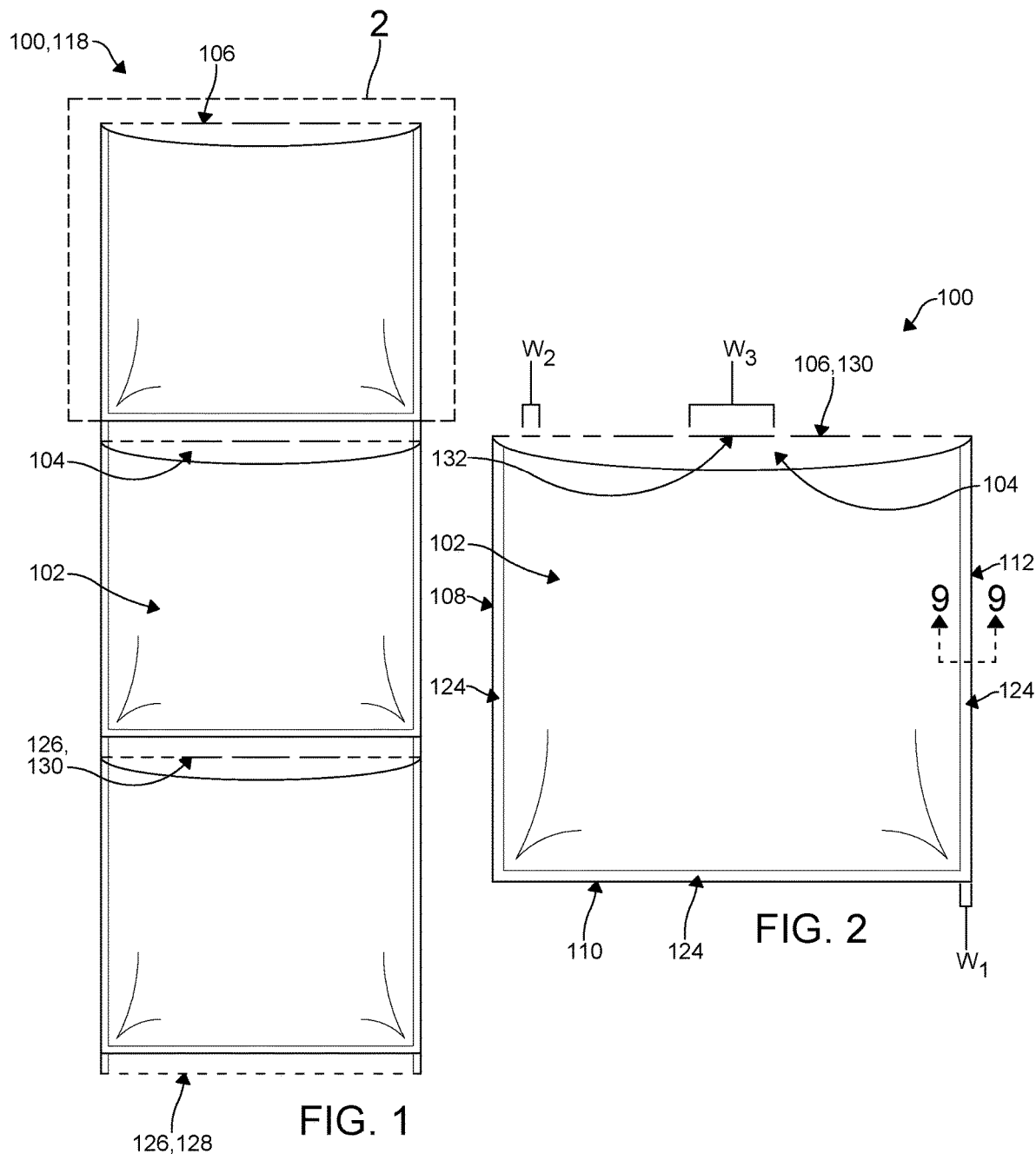

PAPER RECYCLABLE HEAT SEALABLE BAG

CROSS REFERENCE TO RELATED APPLICATIONS

This application claims the benefit of U.S. Provisional Application Ser. No. 63/090,803, filed on Oct. 13, 2020. The entire disclosure of the above application is incorporated herein by reference.

FIELD

The present disclosure relates generally to packaging methods and, more particularly, to packaging bags.

INTRODUCTION

This section provides background information related to the present disclosure which is not necessarily prior art.

Bags used on packaging machines may be made from plastic materials such as polyethylene and polypropylene. While these bags can be recyclable with other plastics, they are usually not curbside recyclable. This is due to the fact that most recycling centers that process residential goods are not able to handle recyclable plastic bags. These recycling centers are able to handle paper bags. Paper bags used on packaging machines may use heat to seal the bags closed and may have an inner layer made of polyethylene or other material that cannot be recycled in the paper recycling stream.

Other paper bags on the market for use in packaging machines do not possess a capability that allows the bags to both be heat sealable and recyclable in the paper recycling stream. They are either heat sealable and not recyclable or recyclable and not heat sealable. Bags currently on the market do not work well because many do not have an inner sealant layer that is capable of being adequately recycled in the paper recycling stream.

Accordingly, there is a continuing need for a bag with an inner sealant layer that is capable of being recycled in the paper recycling stream. Desirably, the bag also may include a heat sealable feature.

SUMMARY

In concordance with the instant disclosure, a bag with an inner sealant layer that is capable of being recycled in the paper recycling stream and also includes a heat sealable feature, has been surprisingly discovered.

A paper recyclable heat sealable bag is provided that includes a heat sealable, water soluble coating and an article of paper. The heat sealable, water soluble coating may be applied to the article of paper via a printing press. As the printing press applies the heat sealable, water soluble coating to the article of paper, the paper recyclable heat sealable bag may be wound into a master roll with a plurality of paper recyclable heat sealable bags. In certain embodiments, the paper recyclable heat sealable bag may be in the form of at least one of a pre-made chain bag and a tube. The pre-made chain bag may include an opening configured to accept packaged items from at least one of a top load orientation and a side load orientation.

The master roll of paper recyclable heat sealable bags may include a plurality of perforations. The plurality of perforations may be formed in a substantially straight line between each of the paper recyclable heat sealable bags. The size of each of the plurality of perforations may be at least one of a uniform sizing and an adjusted sizing. For instance, larger perforations may be formed in a center area of the straight line so that a person may more easily separate the paper recyclable heat sealable bag from the master roll. Alternatively, the paper recyclable heat sealable bag may be separated from the master roll with an automatic packaging machine. For instance, the automatic packaging machine may be the ROLLBAG® R3200, as a non-limiting example.

In another embodiment, the paper recyclable heat sealable bag may be used according to a first method. The first method may include a step of providing a paper recyclable heat sealable bag. Next, the first method may include an additional step of loading the paper recyclable heat sealable bag with at least one product. Then, the first method may include another step of sealing the paper recyclable heat sealable bag with a heat sealer. The first method may additionally include a step of labeling the paper recyclable heat sealable bag for shipping purposes. The first method may additionally include a step of printing the labeling directly onto the paper recyclable heat sealable bag for shipping purposes.

In an alternative embodiment, the paper recyclable heat sealable bag may be used according to a second method. The second method may include a step of providing a paper recyclable heat sealable bag and an automatic packaging machine. The second method may include a step of loading the paper recyclable heat sealable bag into the automatic packaging machine. The second method may include a step of feeding the paper recyclable heat sealable bag through the automatic packaging machine. The second method may include an additional step of opening the paper recyclable heat sealable bag for loading. Next, the paper recyclable heat sealable bag may be sealed. Then, the paper recyclable heat sealable bag may be removed from the automatic packaging machine.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front elevational view of the paper recyclable heat sealable bag provided in a pre-made chain bag setup with a top-load configuration, according to one embodiment of the present disclosure;

FIG. 2 is an enlarged front elevational view the paper recyclable heat sealable bag, taken at call-out 2 in FIG. 1, further depicting the non-uniform perforations between the adjacent paper recyclable heat sealable bags;

Figure 9A:
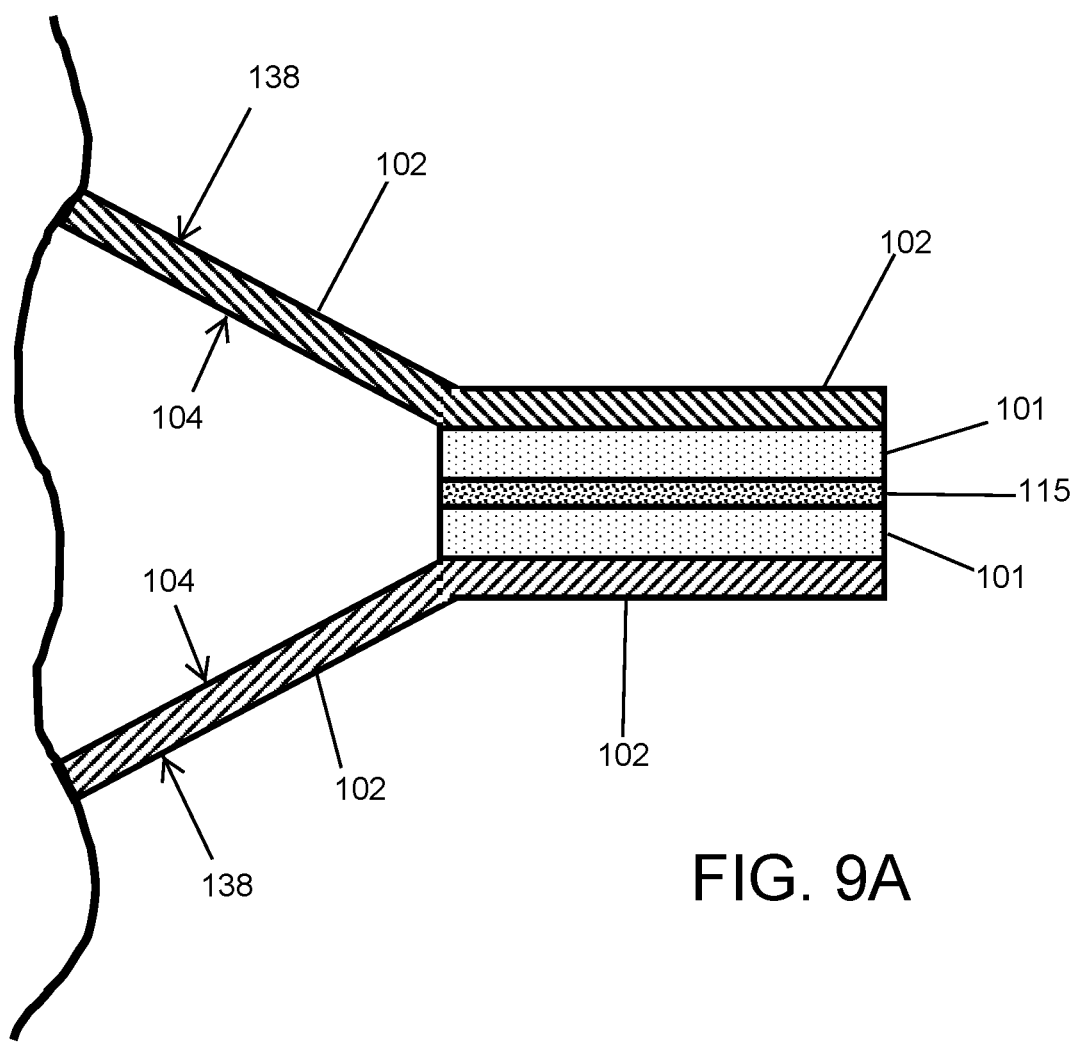
FIG. 9A is a cross-sectional schematic view of the paper recyclable heat sealable bag taken at 9-9 in FIG. 2, further depicting the heat sealable, water soluble coating disposed at an edge of the paper recyclable heat sealable bag.
Figure 9B:
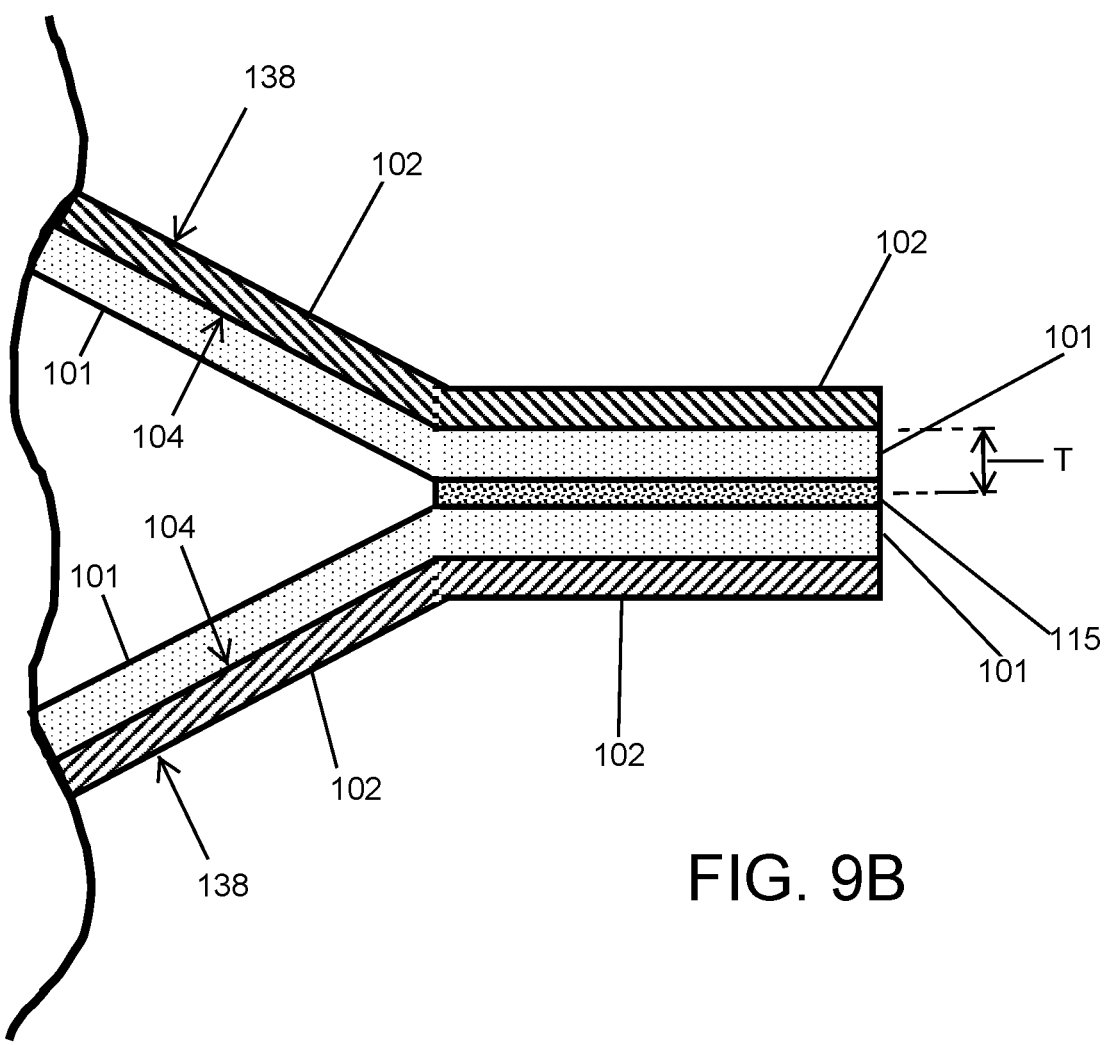
Figure 9C:
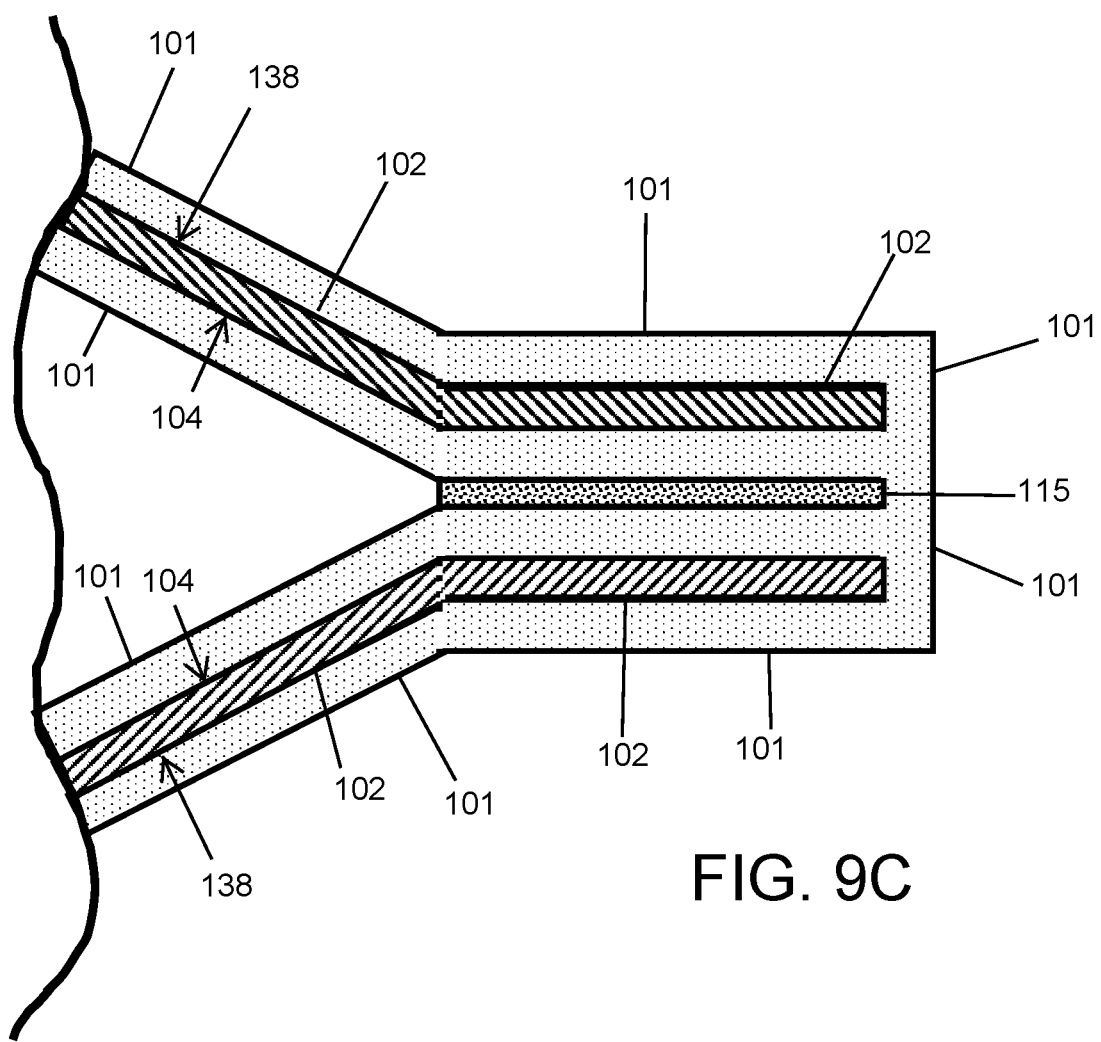

FIG. 9B is a cross-sectional schematic view of the paper recyclable heat sealable bag taken at 9-9 in FIG. 2, further depicting the heat sealable, water soluble coating disposed at the edge and covering an interior surface of the paper recyclable heat sealable bag; and FIG. 9C is a cross-sectional schematic view of the paper recyclable heat sealable bag taken at 9-9 in FIG. 2, further depicting the heat sealable, water soluble coating disposed at the edge and covering both the interior surface and outer surface of the paper recyclable heat sealable bag.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4 and 6, the paper recyclable heat sealable bag 100 includes a heat sealable, water soluble coating 101 and an article of paper 102. The article of paper 102 may be provided in the form of a bag having the heat sealable, water soluble coating 101 applied to an inner surface 104 of the paper recyclable heat sealable bag 100. The heat sealable, water soluble coating 101 may include an acrylic copolymer, where the acrylic copolymer may include one or more of pure acrylic polymer, ethylene acrylic acid copolymer, vinyl acrylic acid copolymer, and styrene acrylic copolymer. A skilled artisan may select other suitable components to form the heat sealable, water soluble inner surface coating 101.

In certain circumstances, the paper recyclable heat sealable bag 100 may be constructed in various ways. The heat sealable, water soluble inner surface coating 101 may be manually applied to the article of paper 102 and/or applied via a printing press (not shown). In a specific example, the heat sealable, water soluble inner surface coating 101 may be applied to a portion of the article of paper 102. In a more specific example, the portion of the article of paper 102 to which the coating 101 is applied may include portions at or near one or more of the edges 106, 108, 110, 112 of the article of paper 102, as shown in FIG. 9A. For instance, the heat sealable water soluble coating 101 may be applied to one or more of the edges 106, 108, 110, 112 of the article of paper 102. As shown in FIG. 2, the heat sealable water soluble coating 101 is applied to edges 108, 110, 112 at the first width $W_1$. In a non-limiting example, the first width $W_1$ of the heat sealable, water soluble inner surface coating 101 may be between about an eighth of an inch to about a quarter of an inch. One skilled in the art may select other suitable widths to form the first width $W_1$, within the scope of the present disclosure. In an alternative embodiment, the heat sealable, water soluble inner surface coating 101 may be applied to the entire inner surface 104 of the article of paper 102, as indicated in FIG. 9B. In certain circumstances, the article of paper 102 may be constructed in the form of a bag by providing at least two sheets and/or webs of paper with the heat sealable, water soluble coating 101 applied therebetween and heat sealed together. In certain circumstances, the heat sealing may form a bond 115 within the heat sealable, water soluble coating 101, thereby sealing the paper recyclable heat sealable bag 100. In an alternative embodiment, the article of paper 102 may be constructed in the form of a bag by providing a single sheet and/or web of paper with the heat sealable, water soluble coating 101 applied thereon. Then, the single sheet and/or web of paper may be folded over and heat sealed to itself. Advantageously, where the heat sealable, water soluble inner surface coating 101 is applied to only a portion of the article of paper 102, the paper recyclable heat sealable bag 100 may efficiently use only a necessary amount of the heat sealable, water soluble inner surface coating 101.

In certain circumstances, the heat sealable, water soluble coating 101 may be applied at various thicknesses. In a specific example, as shown in FIG. 9B, the heat sealable, water soluble coating 101 may have a thickness T of about one-hundredth of a mil (0.00001 inches or 0.00025 mm) to about one half of a mil (0.0005 inches or 0.0127 mm). In a more specific example, the heat sealable, water soluble coating 101 may have a thickness T of about one-tenth of a mil (0.0001 inches or 0.0025 mm) to about one-fifth of a mil (0.0002 inches or 0.0051 mm). In a most specific example, the heat sealable, water soluble coating 101 may have a thickness T of about fifteen hundredths of a mil (0.00015 inches or 0.00381 mm). In certain circumstances, the article of paper 102 may be about five mil (0.005 inches or 0.127 mm). Advantageously, where the thickness T of the heat sealable, water soluble coating 101 is about fifteen hundredths of a mil, the paper recyclable heat sealable bag 100 may be more completely sealed without providing excessive waste. Desirably, where the thickness T of the heat sealable, water soluble coating 101 is about fifteen hundredths of a mil, the paper recyclable heat sealable bag 100 may be more pliable allowing for easier packaging and transportation.

Figure 5:
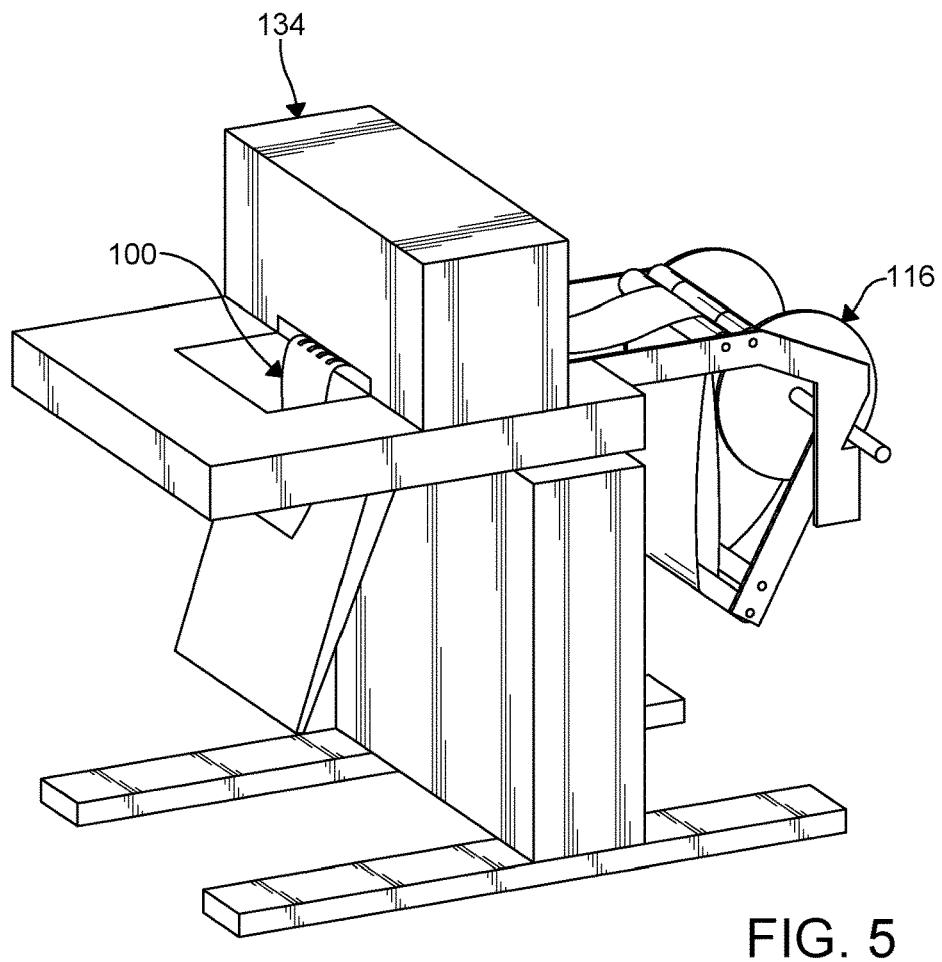
FIG. 5 is a top perspective view of the paper recyclable heat sealable bag being processed through a packaging machine, according to one embodiment of the present disclosure.

In certain circumstances, the heat sealable, water soluble coating 101 may also be applied as an outer surface coating over the article of paper 102, as shown in FIG. 9C. Advantageously, the heat sealable, water soluble coating 101 applied as the outer surface coating over the article of paper 102 may protect the paper recyclable heat sealable bag 100. For instance, the heat sealable, water soluble coating 101 applied as an outer coating may provide a water resistance feature to the paper recyclable heat sealable bag 100. It is also contemplated that a separate coating may be utilized to provide the water resistant feature of the paper recyclable heat sealable bag 100. Desirably, the water resistant feature may militate against the paper recyclable heat sealable bag 100 from becoming saturated with liquid during transport, such as a rainstorm, thereby further protecting the desired contents delivered within the paper recyclable heat sealable bag 100.

Where a printing press (not shown) applies the heat sealable, water soluble coating 101 to the article of paper 102, the paper recyclable heat sealable bag 100 may be wound into a master roll 116 as part of a plurality of paper recyclable heat sealable bags 100, as shown in FIG. 5.

Paper recyclable heat sealable bags 100 provided in accordance with the present technology afford certain benefits and advantages and can be adapted to particular uses. In a specific example, the heat sealable, water soluble coating 101 may be approved for food contact. For instance, the heat sealable, water soluble coating 101 may be approved to contact edible products specifically by militating against any residue from the heat sealable, water soluble acrylic copolymer coating 101 transferring to the edible products. Advantageously, the heat sealable, water soluble, inner surface coating 101 may be used in a variety of packaging machines. Desirably, the paper recyclable heat sealable bag 100 may also be recyclable in the paper waste stream. More specifically, the heat sealable, water soluble coating 101 may be configured to permit the paper recyclable heat sealable bag 100 to be curbside recyclable by possessing certain characteristics such as the capability to quickly dissolve and separate the heat sealable, water soluble coating 101 from the article of paper 102, thereby allowing the article of paper 102 to be more easily recycled and/or repulped.

Figures 3, 4:
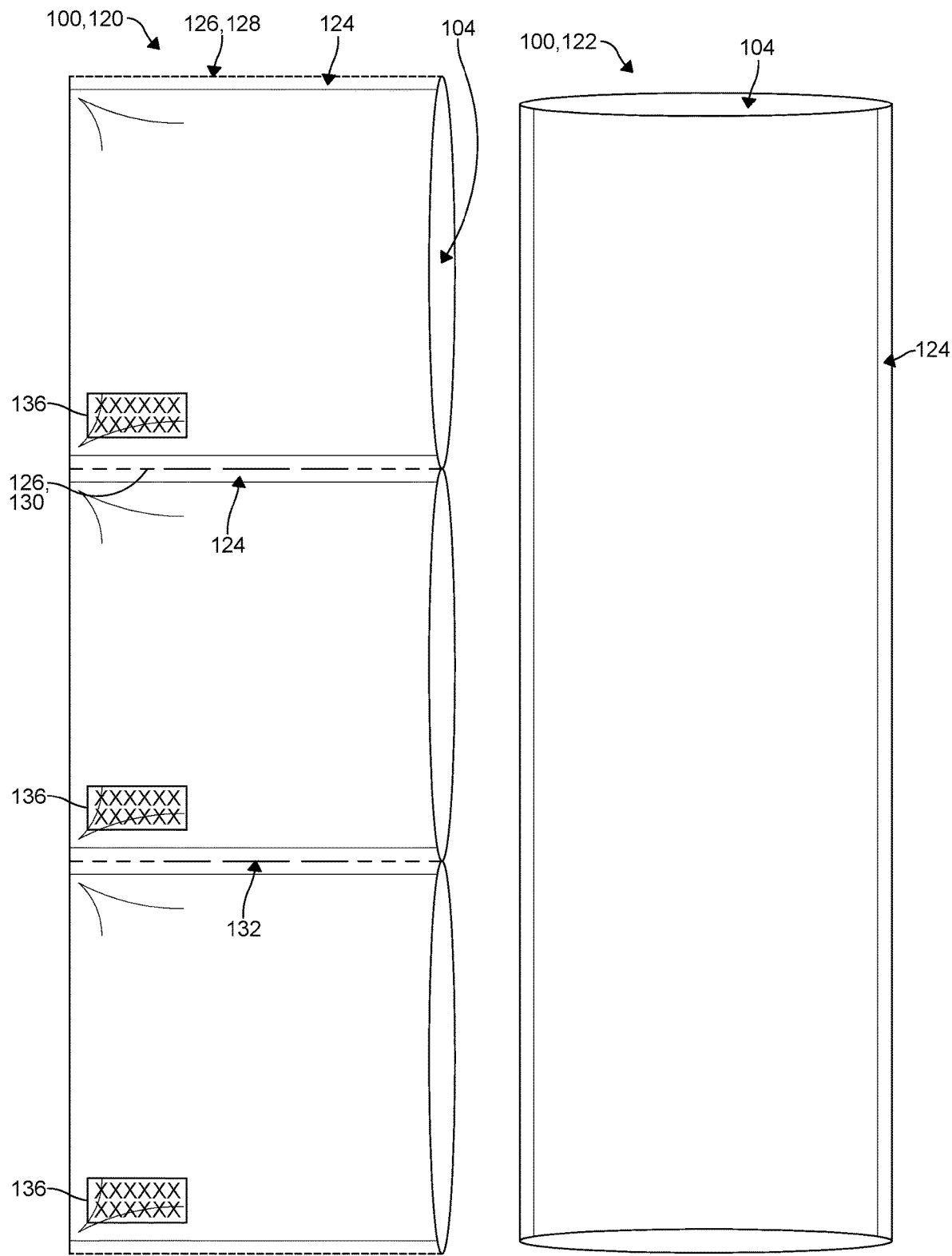
FIG. 3 is a front elevational view of the paper recyclable heat sealable bag provided in a pre-made chain bag setup with a side-load configuration, according to one embodiment of the present disclosure.
FIG. 4 is a front elevational view of the paper recyclable heat sealable bag provided in a pre-made chain bag setup with a tube configuration, according to one embodiment of the present disclosure.

In particular examples, as shown in FIGS. 1-4, the paper recyclable heat sealable bag 100 may be at least one of a pre-made chain bag 118, 120 and a tube 122. The pre-made chain bag 118, 120 may include at least one seal 124 and a perforation 126. The perforation 126 may be disposed along the top edge 106 of the pre-made chain bag 118, 120. The pre-made chain bag 118, 120 may include an opening configured to accept packaged items from at least one of a top load orientation 118 and a side load orientation 120. The top load orientation 118 may be further described as a top load pre-made chain bag 118. As shown in FIGS. 1-2, the opening may be disposed along the top edge 106 of the paper recyclable heat sealable bag 100. In other words, the pre-made chain bag 118 may be constructed with a top load configuration 118 where the top edge 106 of the paper recyclable heat sealable bag 100 is open. The opening of the top load pre-made chain bag 118 may also be disposed on a front surface of the top load pre-made chain bag 118, adjacent the top edge 106. The side load orientation 120 may be further described as a side load pre-made chain bag 120. The side load pre-made chain bag 120 may have an opening on at least one side edge 108, 112 of the paper recyclable heat sealable bag 100. In other words, the side load pre-made chain bag 120 may be constructed with a side load configuration where a side edge 108, 112 of the bag is open. As shown in FIG. 4, the tube configuration 122 of the paper recyclable heat sealable bag 100 may include where the top edge 106 and the bottom edge 110 of the paper recyclable heat sealable bag 100 are open. The paper recyclable heat sealable bag 100 may include an adhesive layer disposed adjacent to the opening of the paper recyclable heat sealable bag 100. The adhesive layer may be configured to allow the paper recyclable heat sealable bag 100 to be sealed manually by a user, rather than requiring a packaging machine to seal the paper recyclable heat sealable bag 100. One skilled in the art may construct the paper recyclable heat sealable bag 100 in different configurations, within the scope of the present disclosure.

The paper recyclable heat sealable bag 100 may include a way to increase the strength of the paper recyclable heat sealable bag 100. For instance, as shown in FIG. 2, the seal 124 of the paper recyclable heat sealable bag 100 may be disposed across the first width $W_1$ which may further be configured to enhance the strength of the paper recyclable heat sealable bag 100. In a specific, non-limiting example, the first width $W_1$ of the seal 124 may be between about a sixteenth of an inch to about three quarters of an inch. In a more specific, non-limiting example, the first width $W_1$ of the seal 124 may be between about an eighth of an inch to about a quarter of an inch. In an even more specific, non-limiting example, the first width $W_1$ of the seal 124 may be about one quarter of an inch. One skilled in the art may select other suitable widths to form the first width $W_1$, within the scope of the present disclosure. Advantageously, where the first width $W_1$ is greater, the strength of the paper recyclable heat sealable bag 100 may be enhanced.

Figure 6:
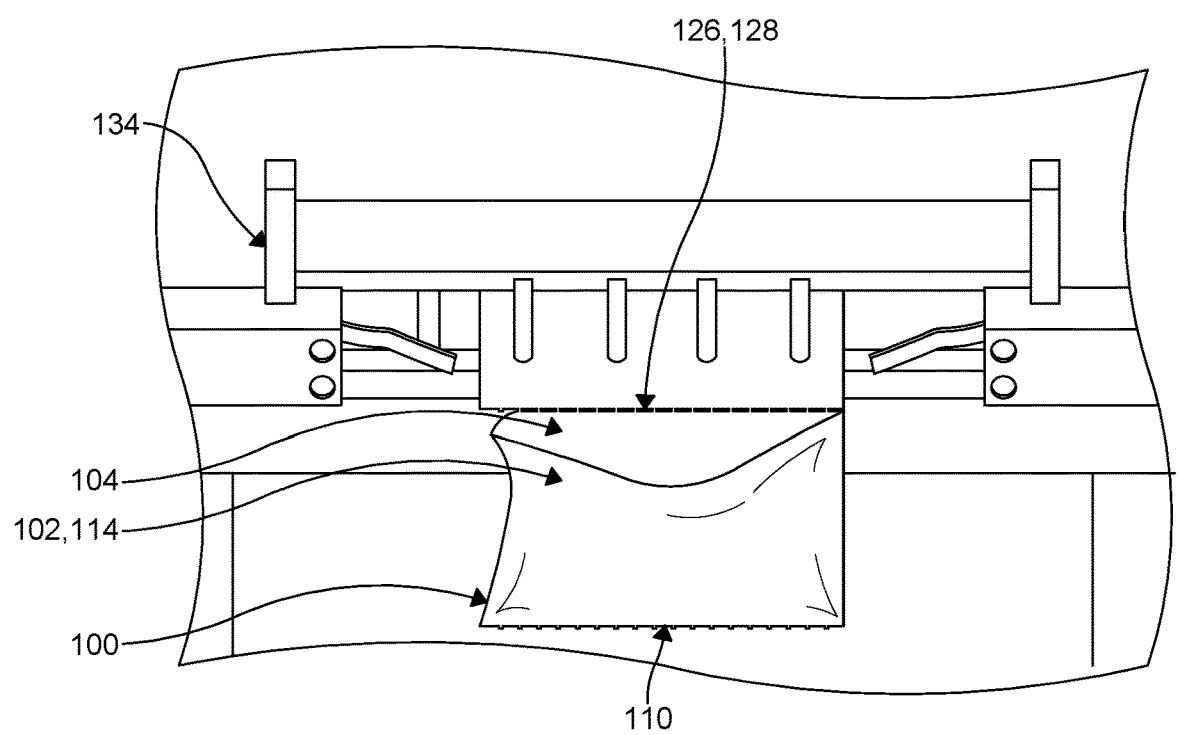
FIG. 6 is a top perspective view of the paper recyclable heat sealable bag being removed from the packaging machine, according to one embodiment of the present disclosure.

The master roll 116 may include a plurality of the perforations 126 between each of the paper recyclable heat sealable bags 100. The perforations 126 may be formed in a substantially straight line between each of the plurality of paper recyclable heat sealable bags 100. The size of each of the perforations 126 may be at least one of a uniform sizing 128 and/or an adjusted sizing 130. In other words, the size of each of the perforations 126 may be non-uniform 130. For instance, larger perforations 126 may be formed in a center area 132 of the straight line of perforations 126 so that a user may more easily separate the paper recyclable heat sealable bag 100 from the master roll 116. Stated otherwise, the perforations 126 formed near a side edge 108, 112 of the master roll 116 may include a second width $W_2$. The perforations 126 formed near the center area 132 of the master roll 116 may include a third width $W_3$. The third width $W_3$ may be greater than the second width $W_2$. Alternatively, as shown in FIG. 6, the paper recyclable heat sealable bag 100 may be separated from the master roll 116 with an automatic packaging machine 134. For instance, the automatic packaging machine 134 may be the ROLLBAG® R785, as a non-limiting example. In another specific example, where the paper recyclable heat sealable bag 100 is in the form of the tube 122, the paper recyclable heat sealable bag 100 may be loaded into an alternative automatic packaging machine 134, such as a ROLLBAG® R3200, as a non-limiting example. One skilled in the art may select other suitable automatic packaging machines, within the scope of the present disclosure.

In certain embodiments, as shown in FIG. 3, the paper recyclable heat sealable bag 100 construction may include a label 136. For instance, the label 136 may include various indicia, including, for example, information on contents, recycling, date, etc. The label 136 may be applied to the paper recyclable heat sealable bag 100 through various ways such as printing the label 136 with the various indicia and separately placing the label 136 on the paper recyclable heat sealable bag 100. In a specific example, the label 136 and various indicia may be printed directly onto the paper recyclable heat sealable bag 100. In another specific example, the label 136 may be pre-applied to the paper 102. For instance, the label 136 may be printed blank, without any indicia, and applied to the paper 102. When the paper 102 is a processed through the automatic packaging machine 134, the various indicia may be applied to the pre-applied label 136. Advantageously, the pre-applied label 136 may permit the various indicia to be applied at the point of packaging. Desirably, where the label 136 is pre-applied to the paper 102, the label 136 may be more securely and more easily applied to the outer surface 138 of the paper recyclable heat sealable bag 100 where the outer surface 138 of the paper recyclable heat sealable bag 100 is covered with the heat sealable, water soluble coating 101 and/or the water-resistant coating. In certain circumstances, the label 136 may be a direct thermal label that permits thermal printing of various indicia thereon. In certain circumstances, the label 136 may be applied at the point of the packaging. In a specific example, the paper recyclable heat sealable bag 100 may be packaged and labeled in packaging machines currently available on the market, with minimal changeover. Advantageously, tracking and scanning of the paper recyclable heat sealable bag 100 in a mailing sortation and distribution process may be enhanced due to the efficient labeling.

In certain embodiments, the paper recyclable heat sealable bag 100 may be used for a variety of end uses. For instance, the paper recyclable heat sealable bag 100 may provide a curbside recyclable packaging means for shipping cosmetics, pill bottles, and clothing, as non-limiting examples. In some instances, the paper recyclable heat sealable bag 100 may be provided without an opening and filled with air, thereby allowing the paper recyclable heat sealable bag 100 to be utilized for void-fill applications such as air-pillows and inflatable cushions, as non-limiting examples. One skilled in the art may select other suitable applications for the paper recyclable heat sealable bag 100, within the scope of the present disclosure.

Figure 7:
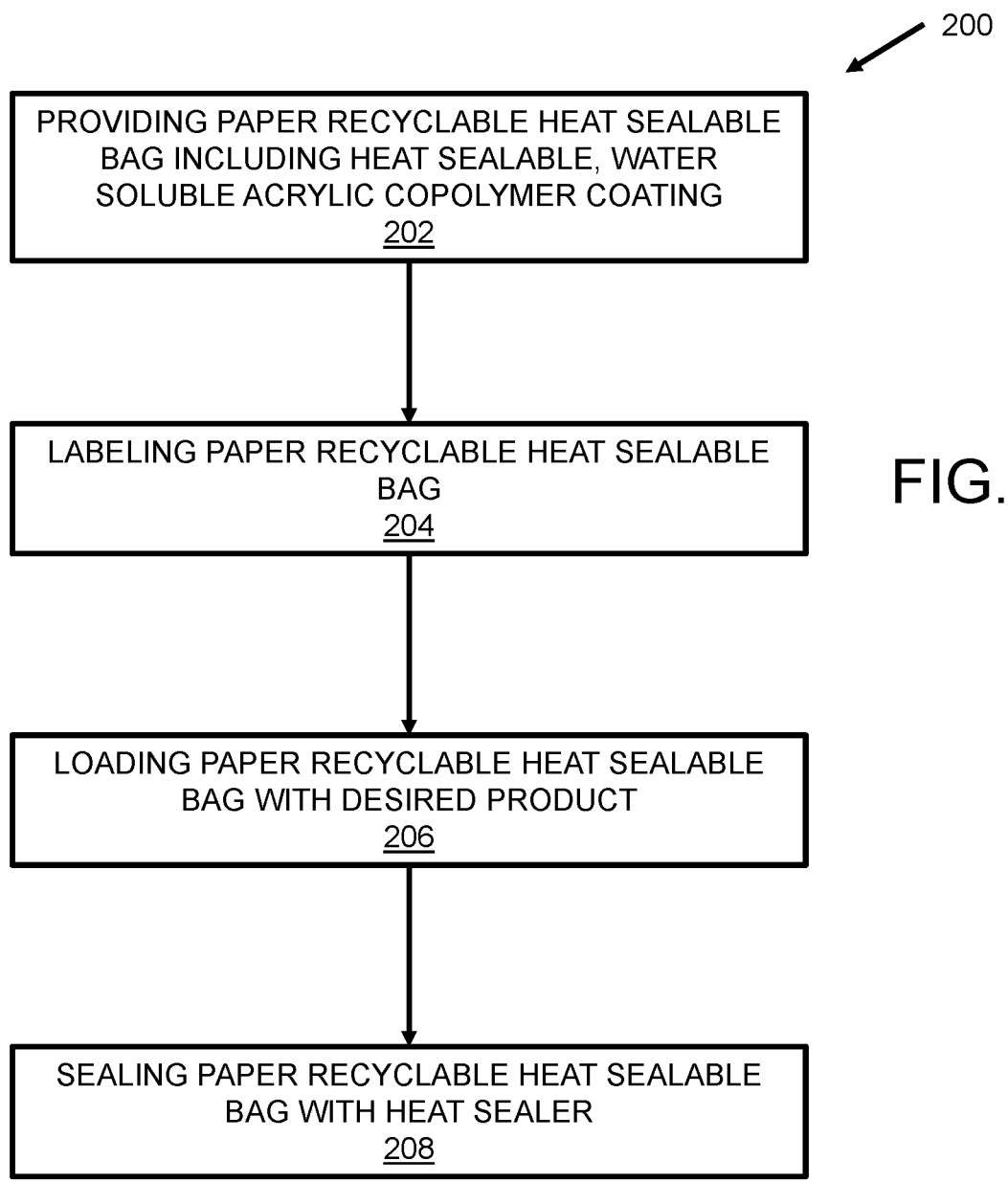
FIG. 7 is a flowchart of a first method for using the paper recyclable heat sealable bag, according to one embodiment of the present disclosure.

As shown in FIG. 7, the paper recyclable heat sealable bag 100 may be used according to a first method 200. The first method 200 may include a step 202 of providing a paper recyclable heat sealable bag 100 in the form of a bag including a heat sealable, water soluble acrylic copolymer coating 101 that may be applied to an inner surface 104 of the bag. Next, the first method 200 may include a step 204 of labeling the paper recyclable heat sealable bag 100 for shipping purposes. In certain circumstances, the label 136 may be printed directly on the paper recyclable heat sealable bag 100 for shipping or other marking purposes. It is contemplated that the step 204 of labeling the paper recyclable heat sealable bag 100 may occur at any point during the first method 200. Then, the first method 200 may include another step 206 of loading the paper recyclable heat sealable bag 100 with a desired product. The first method 200 may additionally include a step 208 of sealing the paper recyclable heat sealable bag 100 with a heat sealer.

Figure 8:
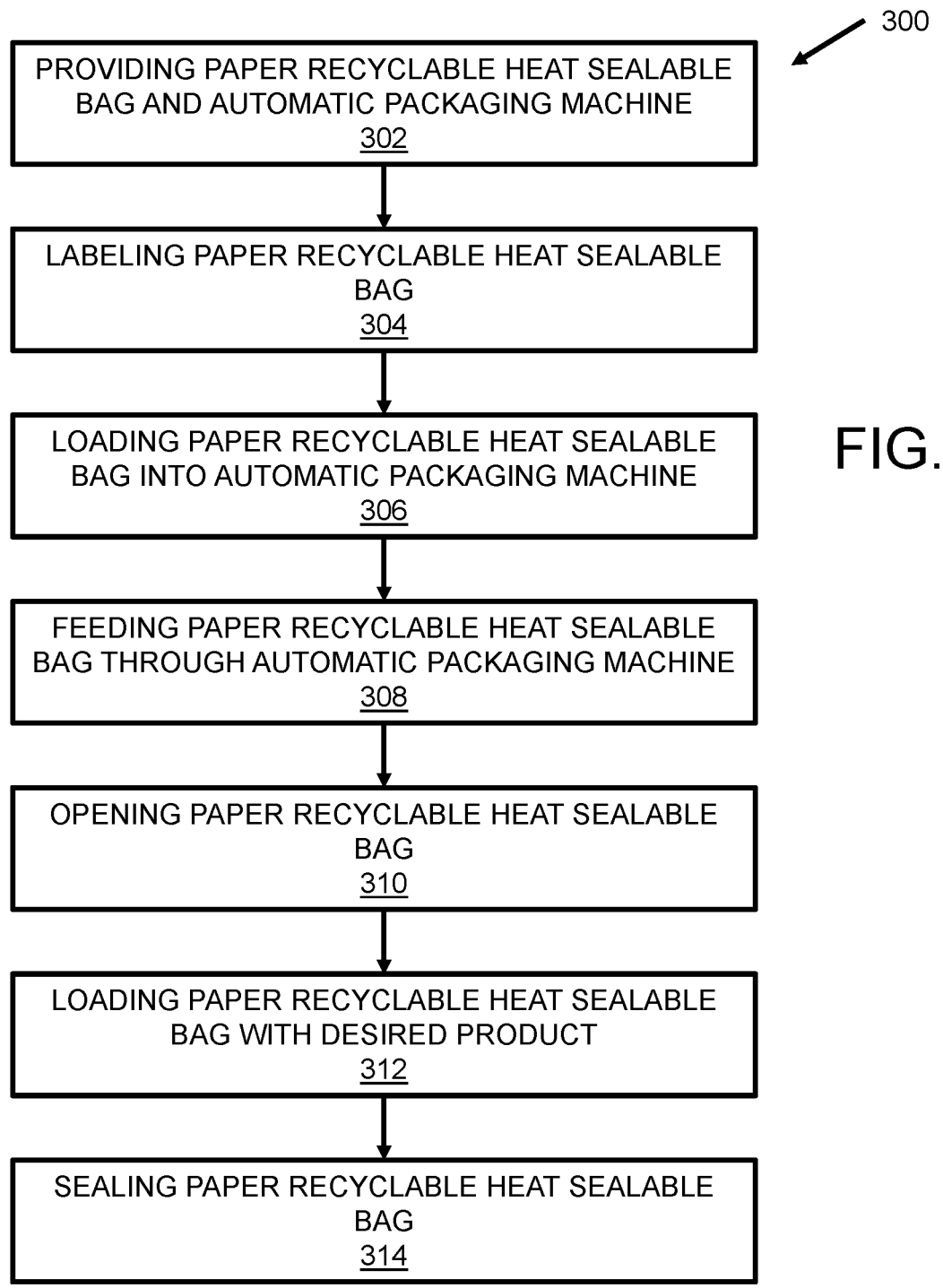
FIG. 8 is a flowchart of a second method for using the paper recyclable heat sealable bag, according to one embodiment of the present disclosure.

As shown in FIG. 8, in an alternative embodiment, the paper recyclable heat sealable bag 100 may be used according to a second method 300. The second method 300 may include a step 302 of providing a paper recyclable heat sealable bag 100 and an automatic packaging machine 134. The paper recyclable heat sealable bag 100 may include an article of paper 102 in the form of a bag having a heat sealable, water soluble acrylic copolymer coating 101 that is applied to an inner surface 104 of the bag. The heat sealable, water soluble acrylic copolymer coating 101 may be printed to the inner surface 104 of the paper recyclable heat sealable bag 100. The second method 300 may include a step 304 of applying a label 136 to the article of paper 102. In a specific example, the label 136 may be a direct thermal label. It should be appreciated that the label 136 may be applied at any point during the second method 300. Next, the paper recyclable heat sealable bag 100 may be loaded into the automatic packaging machine 134. The second method 300 may include a step 308 of feeding the paper recyclable heat sealable bag 100 through the automatic packaging machine 134. The second method 300 may include an additional step 310 of opening the paper recyclable heat sealable bag 100 for loading. Next, the paper recyclable heat sealable bag 100 may be loaded with a desired object. It is contemplated the paper recyclable heat sealable bag 100 may be loaded with air as the desired object where the end product is configured to provide certain functions, such as an air-pillow, as a non-limiting example. The second method 300 may also include a step 314 of sealing the paper recyclable heat sealable bag 100.

The heat sealable, water soluble, coating 101 of the present disclosure may include one or more acrylic polymer or copolymer emulsions. The blend of an acrylic polymer emulsion with a melting wax may improve the heat sealability, overprintability, and barrier properties in an eco-friendly coating. Suitable acrylic polymer or copolymer emulsions include, but are not limited to, one or more of pure acrylic polymer, ethylene acrylic acid copolymer, vinyl acrylic acid copolymer, styrene-acrylic copolymer, combinations thereof, and the like. Further examples of acrylic polymer emulsions include, but are not limited to, Carboset GAW7448; SYNTHRO®-PEL CWO; EUROCRYL 4174XP; EUROCRYL 4184XP; JONCRYL 8052; JONCRYL ECO 2; JONCRYL 8050; Carboset® GA-7428; Carboset® GA-7424; Induprint SE 245; Induprint SE 375; NEOCRYL A2092; NEOCRYL A2099; Induprint SE 288; Texicryl 13.

Advantageously, the paper recyclable heat sealable bag 100 includes a heat sealable, water soluble, coating 101 and an article of paper 102 combination for packaging purposes that is capable of being adequately recycled in the paper recycling stream and also includes a heat sealable feature.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A paper recyclable heat sealable bag system, comprising:
    an article of paper in the form of a bag including a heat sealable, water-soluble coating applied to an inner surface of the bag, the heat sealable, water-soluble coating including an acrylic copolymer,
    the heat sealable, water-soluble coating formed from an acrylic polymer or copolymer emulsion, and
    the heat sealable, water-soluble coating configured to dissolve and separate from the article of paper when the article of paper is one of recycled and repulped.

2. The paper recyclable heat sealable bag system of claim 1, wherein the acrylic copolymer includes a member selected from a group consisting of pure acrylic polymer, ethylene acrylic acid copolymer, vinyl acrylic acid copolymer, styrene acrylic copolymer, and combinations thereof.

3. The paper recyclable heat sealable bag system of claim 1, wherein the bag is constructed with a top load configuration where a top edge of the bag is open.

4. The paper recyclable heat sealable bag system of claim 3, wherein the bag is constructed with a tube configuration where a top edge and a bottom edge of the bag are open.

5. The paper recyclable heat sealable bag system of claim 1, wherein the bag is constructed with a side load configuration where a side edge of the bag is open.

6. The paper recyclable heat sealable bag system of claim 1, wherein the bag includes an adhesive layer disposed adjacent to an opening of the bag, the adhesive layer configured to permit the bag to be manually sealed.

7. The paper recyclable heat sealable bag system of claim 1, wherein the bag includes a seal having a width configured to enhance the strength of the bag, wherein the width of the seal is between an eighth of an inch and a quarter of an inch.

8. The paper recyclable heat sealable bag system of claim 1, wherein the bag is provided in a master roll including a plurality of bags.

9. The paper recyclable heat sealable bag system of claim 8, wherein each bag is coupled to an adjacent bag with a plurality of perforations therebetween, wherein the size of each of the perforations is non-uniform.

10. The paper recyclable heat sealable bag system of claim 9, wherein the plurality of perforations include perforations formed near an edge of the master roll having a second width and perforations formed near a center area of the master roll having a third width, wherein the third width is greater than the second width.

11. The paper recyclable heat sealable bag system of claim 1, wherein the heat sealable, water-soluble coating is approved to contact edible products.

12. The paper recyclable heat sealable bag system of claim 1, wherein the heat sealable, water soluble coating is further applied to an outer surface of the bag including an edge of the bag.

13. The paper recyclable heat sealable bag system of claim 12, wherein:
the acrylic copolymer includes a member selected from a group consisting of pure acrylic polymer, ethylene acrylic acid copolymer, vinyl acrylic acid copolymer, styrene acrylic copolymer, and combinations thereof,
the bag is provided on a master roll with each bag coupled to an adjacent bag with a plurality of non-uniform perforations therebetween and is constructed with at least one of a top load configuration where a top edge of the bag is open, a side load configuration where a side edge of the bag is open, and a tube configuration where a top edge and a bottom edge of the bag are open, and
the bag further includes:
an adhesive layer disposed adjacent to an opening of the bag and configured to permit the bag to be manually sealed, the adhesive layer having a seal having a width between an eighth of an inch and a quarter of an inch and the seal is configured to enhance the strength of the bag,
a seal, and
a label disposed on the outer surface of the bag.

14. A method of using a paper recyclable heat sealable bag system, the method comprising the steps of:
providing the paper recyclable heat sealable bag system having an article of paper in the form of a bag including a heat sealable, water-soluble coating that is applied to an inner surface of the bag, the heat sealable, water-soluble coating formed from an acrylic polymer or copolymer emulsion, and the heat sealable, water-soluble coating configured to dissolve and separate from the article of paper when the article of paper is one of recycled and repulped; and
sealing the paper recyclable heat sealable bag with a heat sealer.

15. The method of claim 14, further comprising a step of loading the paper recyclable heat sealable bag with a desired object after the step of providing the paper recyclable heat sealable bag but before the step of sealing the paper recyclable heat sealable bag.

16. The method of claim 14, wherein the heat sealable, water soluble coating is further applied to an outer surface of the bag including an edge of the bag.

17. A method of using the paper recyclable heat sealable bag system, the method comprising the steps of:
providing a paper recyclable heat sealable bag having an article of paper in the form of a bag including a heat sealable, water soluble acrylic copolymer coating that is applied to an inner surface of the bag, the heat sealable, water soluble coating including an acrylic copolymer, the heat sealable, water soluble coating formed from an acrylic polymer or copolymer emulsion, and the heat sealable, water soluble coating configured to dissolve and separate from the article of paper when the article of paper is one of recycled and repulped;
providing an automatic packaging machine;
loading the paper recyclable heat sealable bag into the automatic packaging machine;
feeding the paper recyclable heat sealable bag through the automatic packaging machine;
opening the paper recyclable heat sealable bag for loading;
loading the paper recyclable heat sealable bag with a desired object; and
sealing the paper recyclable heat sealable bag.

18. The method of claim 17, further comprising a step of applying a label to the article of paper before the step of loading the paper recyclable heat sealable bag into the automatic packaging machine.

19. The method of claim 18, wherein the label is a direct thermal label.

20. The method of claim 17, the heat sealable, water soluble coating is further applied to an outer surface of the bag including an edge of the bag.

\* \* \* \* \*